Patented Aug. 14, 1951

2,564,192

UNITED STATES PATENT OFFICE 2,564,192

CERTAIN OXYALKYLATED DERIVATIVES OF CERTAIN RESINS

Melvin De Groote, University City, and Bernhard Keiser, Webster Groves, Mo., assignors to Petrolite Corporation, Ltd., Wilmington, Del., a corporation of Delaware No Drawing. Application January 6, 1950, Serial No. 137,297

5 Claims. (Cl. 260—53)

The present invention is concerned with certain new chemical products, compounds, or compositions having useful application in various arts.

This application is a continuation-in-part of our co-pending application Serial No. 8,723, filed February 16, 1948, now Patent 2,499,366, granted March 7, 1950. It includes methods or procedures for manufacturing said new chemical products, compounds, or compositions themselves.

Said new compositions are hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, xylene-soluble, water-insoluble, acid-catalyzed, low-stage phenol-glyoxal resin; said resin being derived by reaction between a difunctional monohydric phenol and glyoxal; said resin being formed in the substantial absence of trifunctional phenols; said phenol being of the formula:

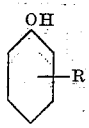

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_{n'}$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 137,296, filed January 6, 1950.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes, as lubricants, etc.

We have referred to the reaction product of the selected difunctional phenols and glyoxal as resins. We are not entirely convinced that the reactants invariably and inevitably contain three or more structural units, as described in our co-pending application Serial No. 8,723, filed February 16, 1948, unless a secondary heating step is employed. Glyoxal is sometimes used in connection with another aldehyde to produce resins as illustrated by Example 12a in aforementioned co-pending application Serial No. 8,723.

As is well known, glyoxal is the simplest dialdehyde. It is a greenish-yellow, water-soluble liquid, which, in the pure state, polymerizes readily to a white mass. It is marketed in the form of an aqueous 30% solution. In most cases, aqueous glyoxal demonstrates the expected reactions of the dialdehyde structure. We are not certain, however, that this necessarily follows in the manufacture of resins under every possible condition. In fact, we suspect that in some instances glyoxal may produce a compound having peculiar properties suggestive of the following structures:

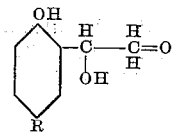

or

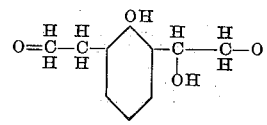

It well may be that the reaction products of the kind herein described, and particularly before a subsequent heating stage, should more properly be referred to as condensation products, rather than resins, but for convenience, and also insofar that their complete structure is unknown, we are preferring to refer to them as resins. In substantially all cases, the product of initial reaction can be heated until there is a decided increase in viscosity along with an increase in molecular weight which would undoubtedly bring them within the resin range, i. e., products having three or more aromatic nuclei.

The soft initial resins which act in some ways like phenol alcohols, may really represent mixtures of higher polymers with dimers along with possibly some mono-nuclear phenol alcohols. They are at least comparable to similar products obtained by the use of difunctional phenols and formaldehyde by use of an alkaline catalyst. As is well known, such alkaline catalyzed resins can be heated to 200°–225° C., with the liberation of some additional water, or, in some instances, formaldehyde, so as to yield a much harder thermoplastic resin of a higher molecular weight. The same treatment hardens the glyoxal resins in much the same manner.

For purpose of convenience, what is said hereinafter will be divided into two parts: Part 1 will be concerned with the production of the resin from a mixture of the kind specified and described in greater detail subsequently, and Part 2 will be concerned with the oxyalkylation of the resin so as to convert it into a hydrophile hydroxylated derivative.

PART 1

Previous reference has been made to the fact that the procedure used to make the initial phenolglyoxal resin is substantially the same procedure as is used to make an acid-catalyzed resin, using the same phenol and formaldehyde. It was subsequently pointed out, however, that in some ways the resultant product is more closely akin to the resins obtained by reacting the selected phenol with formaldehyde in presence of an alkaline catalyst, particularly in light of the fact that it can be hardened further by a secondary heating stage. For this reason and in order to illustrate the procedure employed, we are including herein five examples of resins manufactured as they appear in our copending application Serial No. 8,723, filed February 16, 1948. In that particular application see Examples 1a, 44a, 45a, 52a and 53a.

*Example 1a*

| | Grams |
|---|---|
| Para-tertiary butylphenol (1.0 mole) | 150 |
| Formaldehyde 37% (1.0 mole) | 81 |
| Concentrate HCl | 1.5 |
| Monoalkyl ($C_{10}$–$C_{20}$, principally $C_{12}$–$C_{14}$) benzene monosulfonic acid sodium salt | 0.8 |
| Xylene | 100 |

(Examples of alkylaryl sulfonic acids which serve as catalysts and as emulsifiers particularly in the form of sodium salts, include the following:

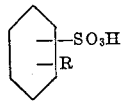

R is an alkyl hydrocarbon radical having 12–14 carbon atoms.

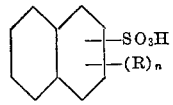

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof, wherein the alkyl group contains 10 to 14 carbon atoms. We have found equally effective and interchangeable the following specific sulfonic acids, or their sodium salts: A mixture of di- and tripropylated napthalene monosulfonic acid; diamylated napthalene monosulfonic acid; and nonyl naphthalene monosulfonic acid.)

*Example 2a*

| | Grams |
|---|---|
| Para-tertiary amylphenol | 492 |
| Formaldehyde, 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2.0 |
| Xylene | 200 |

The above reactants were combined in a resin pot similar to that previously described, equipped with stirrer and reflux condenser. The reactants were heated with stirring under reflux for 2 hours at 100° to 110° C. The resinous mixture was then permitted to cool sufficiently to permit the addition of 15 ml. of glacial acetic acid in 150 cc. $H_2O$. On standing, a separation was effected, and the aqueous lower layer drawn off. The upper resinous solution was then washed with 300 ml. of water to remove any excess HCHO, sodium acetate, or acetic acid. The xylene was then removed from the resinous solution by distilling under vacuum to 150° C. The resulting resin was clear, light amber in color, and semi-fluid or tacky in consistency.

*Example 3a*

| | Grams |
|---|---|
| Para-secondary butylphenol | 450 |
| Formaldehyde 37% | 528 |
| NaOH in 30 cc. $H_2O$ | 6.8 |
| Monoalkyl ($C_{10}$–$C_{20}$, principally $C_{12}$–$C_{14}$) benzene monosulfonic acid sodium salt | 2 |
| Xylene | 200 |

The same procedure was followed as in Example 2a. The resulting solvent-free resin was clear, light amber in color, and semi-fluid or tacky in consistency.

*Example 4a*

Resin of Example 2a was subjected to vacuum distillation to 225° C., at 25 mm. Hg. The resulting product was a hard, brittle resin, xylene-soluble, and having a melting point of 145°–150° C.

*Example 5a*

Resin of Example 3a was subjected to vacuum distillation to 225° C., at 25 mm. Hg. The resulting product was hard, brittle, black in color, xylene-insoluble, and infusible up to 220° C. However, if the vacuum distillation was taken to only 175° or 180° C., at 25 mm. Hg, the resulting product was xylene-soluble and had a melting point of approximately 170° C.

*Example 6a*

| | Grams |
|---|---|
| Para-tertiary amylphenol (1.0 mole) | 164 |
| Glyoxal (0.5 mole) | 96 |
| Xylene | 200 |
| Para-toluene sulfonic acid | 4 |

The phenol, solvent, and acid catalyst were heated to 125°–130° C., before starting to add slowly the aldehyde below the surface of the phenol solution. The addition was made at such a rate that the temperatures of 125°–135° C. were maintained. The water was removed continuously, with 69 cc. being distilled off. This was an increase over the previous attempts. No insoluble matter was noted.

The solvent-free product was reddish-black in color, xylene-soluble and soft to semi-fluid in consistency. If heated to 200°–210° C., a hard, brittle resin would result. The final product contained 51% xylene.

It is to be noted that the resinification or condensation takes place in the presence of an acid catalyst. We have found that in presence of any substantial amount of water, for instance, the amount of water solution in the available technical grade of glyoxal (about 70%), this seems to cause a decomposition or side reaction that result in some black or dark brown charry or granular matter. This undesirable by-product does not seem to appear if water is eliminated, immediately. For this reason, note that the manipulative step is somewhat different than that employed in using the same phenol or formaldehyde, as illustrated in Example 1a, preceding. Note this modified procedure is used throughout in connection with glyoxal.

*Example 7a*

| | Grams |
|---|---|
| Para-tertiary amylphenol (1.0 mole) | 164 |
| Glyoxal 30.1% (1.0 mole) | 192 |
| Xylene | 200 |
| Para-toluene sulfonic acid | 4 |

The same procedure was followed as in Example 6a, preceding. A small amount of some carbon-like insoluble matter was noted. Only 130 cc. water distilled off, which was not quite the amount of water in solution. There was no water of reaction noted.

The solvent-free product was reddish-black in color, clear, xylene-soluble, and fairly hard but not brittle, and had a low melting point. The final product contained 47% xylene.

*Example 8a*

| | Grams |
|---|---|
| Para-tertiary butylphenol (2.0 moles) | 300 |
| Glyoxal (1.0 mole) | 192 |
| Xylene | 300 |
| Para-toluene sulfonic acid | 8 |

The same procedure was followed as in Example 6a, preceding. The amount of water distilled off was 134 cc.

The solvent-free product was reddish-black in color, xylene-soluble and hard but not brittle, with a fairly low melting point. The final product contained 45.5% xylene.

*Example 9a*

| | Grams |
|---|---|
| Para-tertiary butylphenol (2.0 moles) | 300 |
| Glyoxal 30.1% (2.0 moles) | 384 |
| Xylene | 300 |
| Para-toluene sulfonic acid | 8 |

The same procedure was used as in Example 6a, preceding. The amount of water distilled off was 268 cc.

The solvent-free resin was very similar to that obtained in Example 8a, preceding. The final product contained 41.8% xylene.

*Example 10a*

| | Grams |
|---|---|
| Para-octylphenol (2.0 moles) | 412 |
| Glyoxal 30.1% (1.0 mole) | 192 |
| Xylene | 400 |
| Para-toluene sulfonic acid | 8 |

The same procedure was followed as in Example 6a, preceding. The amount of water distilled off was 134 grams.

The solvent-free resin was reddish-black and clear in color, xylene-soluble, and semi-hard to pliable in consistency. The final product contained 45.8% xylene.

*Example 11a*

| | Grams |
|---|---|
| Para-octylphenol (2.0 moles) | 412 |
| Glyoxal 30.1% (2.0 moles) | 384 |
| Xylene | 400 |
| Para-toluene sulfonic acid | 8 |

The same procedure was followed as in Example 6a, preceding. The amount of water distilled off was 268 cc.

The solvent-free resin was similar to the product obtained in Example 10a, preceding, and contained 45% xylene.

*Example 12a*

| | Grams |
|---|---|
| Nonylphenol (2.0 moles) | 440 |
| Glyoxal (1.0 mole) | 192 |
| Xylene | 350 |
| Para-toluene sulfonic acid | 10 |

The same procedure was followed as in Example 6a, preceding. 134 cc. water was distilled off.

The solvent-free resin was reddish-black in color, xylene-soluble and semi-soft or tacky in consistency. The final product contained 41.2% xylene.

*Example 13a*

| | Grams |
|---|---|
| Nonylphenol (2.0 moles) | 440 |
| Glyoxal (2.0 moles) | 384 |
| Xylene | 350 |
| Para-toluene sulfonic acid | 10 |

The same procedure was followed as in Example 6a, preceding. The amount of water distilled off was 268 cc.

The solvent-free resin was reddish-black in color, xylene-soluble and semi-soft to pliable, but not tacky in consistency. The final product contained 38.6% xylene.

*Example 14a*

| | Grams |
|---|---|
| Menthylphenol (2.0 moles) | 464 |
| Glyoxal (1.0 mole) | 192 |
| Xylene | 400 |
| Para-toluene sulfonic acid | 10 |

The same procedure was followed as in Example 6a, preceding. The amount of water distilled out was 134 cc.

The solvent-free resin was reddish-black and clear in color, xylene-soluble, and hard to semi-tacky in consistency. The final product contained 43.5% xylene.

*Example 15a*

Example 6a was subjected to vacuum distillation in the manner described in Example 5a, preceding, so as to eliminate the xylene and also so as to produce a hard resin. During the vacuum distillation the temperature was taken up to 175° only.

Example 16a

The same procedure was followed as in Example 15a, except that the resin employed was the one described under the heading of Example 7a.

Example 17a

The same procedure was followed as in Example 15a except that the resin employed was the one described under the heading of Example 8a.

Example 18a

The same procedure was followed as in Example 15a, except that the resin employed was the one described under the heading of Example 9a.

Example 19a

The same procedure was followed as in Example 15a, except that the resin employed was the one described under the heading of Example 10a.

Example 20a

The same procedure was followed as in Example 15a, except that the resin employed was the one described under the heading of Example 11a.

Example 21a

The same procedure was followed as in Example 15a, except that the resin employed was the one described under the heading of Example 12a.

Example 22a

The same procedure was followed as in Example 15a, except that the resin employed was the one described under the heading of Example 13a.

Example 23a

The same procedure was followed as in Example 15a, except that the resin employed was the one described under the heading of Example 14a.

PART 2

Example 1b

The resin employed was the one described under the heading of Example 6a. The solution contained approximately 50% xylene. The amount of solution used was 200 grams. The amount of sodium methylate added was 3%, based on the solution-free resin, i. e., 3 grams. 100 grams of ethylene oxide were added during the first addition. This required 5½ hours for reaction. The maximum temperature during this time was 160° C., and the pressure was 150 pounds. The resulting product was a non-viscous, water-emulsifiable oil, which was deep amber in color.

The entire oxyalkylation was carried out in a small laboratory autoclave of the kind conventionally used for this purpose, equipped with a thermometer, agitator, pressure gauge, etc. The agitation was conducted at approximately 200–250 R. P. M. Needless to say, the mixture was stirred constantly during the reaction and the reaction considered at an end when there was no further drop in pressure, thus indicating that all the ethylene oxide present had reacted. The pressure registered on the gauge at the end of the reaction indicated the vapor pressure of xylene at the indicated temperature.

A second 100 grams of ethylene oxide were then added. This required 4 hours. During the second addition the maximum temperature was 160° C. and the maximum pressure 200 pounds. The resultant product was a non-viscous, deep-amber-colored liquid which was soluble in water or dilute solution, i. e., approximately 5% or less.

Example 2b

The same procedure was followed as in Example 1b, preceding, except that the resin employed was the one described under the heading of Example 7a, preceding. 200 grams of resin solution containing 47% xylene were employed. The amount of sodium methylate employed was 3 grams. The amount of ethylene oxide added during the first addition was 95 grams. The time required to add the ethylene oxide was 5¼ hours. The maximum temperature during this first addition was 150° C., and the maximum pressure 180 pounds. The pressure is given in all cases as pounds per square inch gauge pressure. At the end of this period the reaction mass was a non-viscous, deep-amber-colored oil which was water-emulsifiable.

During the second addition of ethylene oxide 100 grams were added. The time required was 4¾ hours. The maximum temperature was 160° C., and the maximum pressure 200 pounds. The resulting product was a non-viscous, deep amber-colored oil which was more readily water-emulsifiable than before, but not yet water-soluble.

The third addition of ethylene oxide was made employing a second 100 grams. The time required to add the ethylene oxide was 5⅓ hours, and the maximum temperature was 150° C., and the maximum pressure 207 pounds. The resultant product was a water-soluble, non-viscous liquid having a deep amber color.

Example 3b

The same procedure was followed as in Example 1b, preceding, except that the resin employed was the one described under the heading of Example 8a, preceding. 200 grams of resin solution containing 45.5% xylene were employed. The amount of sodium methylate employed was 3 grams. The amount of ethylene oxide added during the first addition was 120 grams. The time required to add the ethylene oxide was 4⅓ hours. The maximum temperature during this first addition was 162° C., and the maximum pressure 205 pounds. At the end of this period the reaction mass was a non-viscous, water-emulsifiable liquid.

The second addition of ethylene oxide was 100 grams. The time required was 4½ hours; the maximum temperature was 157° C., and the maximum pressure 202 pounds. The resulting product was a non-viscous, deep-amber-colored liquid which was water-emulsifiable but not yet water-soluble.

The third addition of ethylene oxide was in the amount of 100 grams. The time required was 4¾ hours; the maximum temperature 150° C., and the maximum pressure was 190 pounds. The resultant product was a non-viscous, completely water-soluble liquid, of a deep amber color.

Example 4b

The same procedure was followed as in Example 1b, preceding, except that the resin employed was the one described under the heading of Example 9a, preceding. 200 grams of resin solution containing 41.8% xylene were employed. The amount of sodium methylate employed was 3 grams. The amount of ethylene oxide added during the first addition was 129 grams. The time required to add the ethylene oxide was 3 hours. The maximum temperature during this first addition was 165° C., and the maximum pressure 215 pounds. At the end of this period the reaction mass was a non-viscous, deep amber-colored liquid, which was water-emulsifiable.

The second addition of ethylene oxide was 100 grams. The time required was 1½ hours; the maximum temperature was 160° C., and the maximum pressure 180 pounds. The resulting product was a somewhat viscous, water-soluble liquid.

The third addition of ethylene oxide was made, employing a second 100 grams. The time required to add the ethylene oxide was 4½ hours, the maximum temperature was 158° C., and the maximum pressure 145 pounds per square inch gauge pressure. The resultant product was a non-viscous, water-soluble liquid of a deep amber color.

Example 5b

The same procedure was followed as in Example 1b, preceding, except that the resin employed was the one described under the heading of Example 10a, preceding. 200 grams of resin solution containing 45.8% xylene were employed. The amount of sodium methylate used was 3 grams. The amount of ethylene oxide added during the first addition was 81 grams. The time required to add the ethylene oxide was 10 hours. The maximum temperature during this first addition was 165° C., and the maximum pressure was 155 pounds. At the end of this period the reaction mass was a non-viscous, deep amber-colored liquid which was water-emulsifiable.

The second addition of ethylene oxide was in the amount of 100 grams. The time required was 5½ hours; the maximum temperature was 160° C., and the maximum pressure 200 pounds. The resulting product was a non-viscous, water-emulsifiable liquid.

The third addition of ethylene oxide was made employing a second 100 grams. The time required was 5⅔ hours to add the ethylene oxide, the maximum temperature was 165° C., and the maximum pressure 210 pounds. The resultant product was a non-viscous, almost water-soluble, deep amber-colored liquid.

Example 6b

The same procedure was followed as in Example 1b, preceding, except that the resin employed was the one described under the heading of Example 11a, preceding. 200 grams of resin solution containing 43% xylene were employed. The amount of sodium methylate used was 3 grams. The amount of ethylene oxide added during the first addition was 85.5 grams. The time required to add the ethylene oxide was 5½ hours. The maximum temperature during this first addition 150° C., and the maximum pressure 175 pounds. At the end of this period the reaction mass was a non-viscous, water-emulsifiable liquid.

The second addition of ethylene oxide was in the amount of 100 grams. The time required to add this material was 5½ hours. The maximum temperature was 145° C., and the maximum pressure 195 pounds. The resulting product was a non-viscous, water-emulsifiable liquid.

The third addition of ethylene oxide was made, employing a second 100 grams. The time required to add the ethylene oxide was 5⅔ hours, the maximum temperature was 157° C., and the maximum pressure 190 pounds. The resultant product was a non-viscous, deep amber-colored, water-soluble liquid.

Example 7b

The same procedure was used as in Example 1b, preceding, except that the resin employed was the one described under the heading of Example 12a, preceding. 200 grams of resin solution containing 41.2% xylene, were employed. The amount of sodium methylate employed was 3 grams. The amount of ethylene oxide added during the first addition was 94 grams. The time required to add the ethylene oxide was 5½ hours. The maximum temperature during this first addition was 165 C., and the maximum pressure 165 pounds. At the end of this period the reaction mass was a non-viscous, water-emulsifiable liquid.

During the second addition of ethylene oxide 100 grams were added. The time required was 5⅔ hours. The maximum temperature was 162° C., and the maximum pressure was 205 pounds. The resulting product was a non-viscous, water-emulsifiable liquid.

The third addition of ethylene oxide was made employing a second 100 grams. The time required to add the ethylene oxide was 5⅔ hours, and the maximum temperature was 155° C., and the maximum pressure was 200 pounds. The resultant product was a water-soluble, non-viscous liquid.

Example 8b

The same procedure was followed as in Example 1b, preceding, except that the resin employed was the one described under the heading of Example 13a, preceding. 200 grams of resin solution containing 38.6% xylene were employed. The amount of sodium methylate employed was 3 grams. The amount of ethylene oxide added during the first addition was 88 grams. The time required to add the ethylene oxide was 5⅔ hours. The maximum temperature during this first addition was 168° C., and the maximum pressure 180 pounds. At the end of this period the reaction mass was a non-viscous, water-emulsifiable liquid.

The second addition of ethylene oxide consisted of 100 grams. The time required was 6 hours; the maximum temperature was 160° C., and the maximum pressure 190 pounds. The resulting product was a non-viscous, water-emulsifiable liquid.

The third addition of ethylene oxide was made employing a second 100 grams. The time required to add the ethylene oxide was 5⅔ hours, and the maximum temperature was 150° C., and maximum pressure 175 pounds. The resulting product was a non-viscous, water-soluble liquid.

Example 9b

The same procedure was followed as in Example 1b, preceding, except that the resin employed was the one described under the heading of Example 14a, preceding. 200 grams of resin solution containing 43.5% xylene were employed. The amount of sodium methylate employed was 3 grams. The amount of ethylene oxide added during the first addition was 86 grams. The time required to add the ethylene oxide was 6 hours. The maximum temperature during this first addition was 150° C., and the maximum pressure 160 pounds. At the end of this period the reaction mass was a non-viscous, water-emulsifiable, deep amber-colored liquid.

The second addition of ethylene oxide was 100 grams. The time required was 5⅔ hours. The maximum temperature was 150° C., and the maximum pressure 195 pounds. The resulting product was a non-viscous, water-emulsifiable liquid.

The third addition of ethylene oxide was made, employing a second 100 grams. The time required to add the ethylene oxide was 5⅓ hours, the maximum temperature was 150° C., and the maximum pressure 205 pounds. The resultant product was a non-viscous liquid, rapidly becoming water-soluble.

A final addition of ethylene oxide in the amount of 100 grams was made. The time required to add this material was 5⅝ hours, at a maximum temperature of 150° C., and a maximum pressure of 200 pounds. The resultant product was a water-soluble, non-viscous, amber-colored liquid.

Example 10b

The resin described under the heading of Example 6a, was subjected to vacuum distillation and heating to 175° C. in the manner described under the heading of Example 4a. The resin so obtained is identical with the resin described under Example 15a. 100 grams of the hard, solvent-free resin so obtained were re-dissolved in 100 grams of xylene and mixed with 3 grams of sodium methylate and treated with ethylene oxide in substantially the same manner as in Example 1b, preceding. The amount of ethylene oxide added was 300 grams in three batches of 100 grams each. The conditions of addition were substantially the same as in preceding examples, i. e., the maximum temperature stayed within the range of 150° to 180° C., and the maximum pressure stayed within the range of 150 to 210 pounds. The time of addition varied from approximately 4 to 6 hours in all instances, being approximately 5 hours as the average.

After the addition of the first 100 grams of ethylene oxide there was an increase in emulsifying property. With the addition of the final 100 grams of ethylene oxide, the product gave a clear solution in water. The final product was an amber red, non-viscous solution.

Example 11b

The same procedure was followed as in Example 10b, preceding, except that the resin employed was that described under the heading of Example 8a. The resin so obtained was identical with the resin described under Example 17a. The conditions of operation, emulsifiability tests, appearance of final product, etc., were substantially identical with those described in Example 10b, preceding.

Example 12b

The same procedure was followed as in Example 10b, preceding, except that the resin employed was that described under the heading of Example 10a. The resin so obtained was identical with the resin described under Example 19a. The conditions of operation, emulsifiability tests, appearance of final product, etc., were substantially the same as those described in Example 10b, preceding.

Example 13b

The same procedure was followed as in Example 10b, preceding, except that the resin employed was that described under the heading of Example 12a. The resin so obtained was identical with the resin described under Example 21a. The conditions of operation, emulsifiability tests, appearance of final product, etc., were substantially the same as those described in Example 10b, preceding.

Example 14b

The same procedure was followed as in Example 10b, preceding, except the resin employed was that described under the heading of Example 14a. The resin so obtained was identical with the resin described under Example 23a. The conditions of operation, emulsifiability tests, appearance of final product, etc., were substantially the same as those described in Example 10b, preceding.

Example 15b

The same reactants, and procedure, were employed as in Example 10b, preceding, except that propylene oxide was employed instead of ethylene oxide. The resultant, even on the addition of the alkylene oxide in the weight proportions of the previous example, has diminished hydrophile properties, in comparison with the resultants of Example 10b. This illustrates the point that propylene oxide and butylene oxide give products of lower levels of hydrophile properties than does ethylene oxide.

Example 16b

The same reactants and procedure were follower as in Example 10b, except that one mole of glycide was employed initially per hydroxyl radical. This particular reaction was conducted with extreme care and the glycide was added in small amounts representing fractions of a mole. Ethylene oxide was then added, following the procedure of Example 10b, to produce products of greater hydrophile properties. We are extremely hesitant to suggest even the experimental use of glycide and methylglycide, for the reason that disastrous results may be obtained, even in experimentation with laboratory quantities.

Attention is directed to the fact that the resins herein described must be fusible and soluble in a non-polar solvent, such as xylene, although obviously, they may be soluble and usually are, in other polar or oxygenated solvents, as previously noted. Fusible resins invariably are soluble in one or more organic solvents, such as those mentioned elsewhere herein. It is to be emphasized, however, that the organic solvent employed to indicate or assure that the resin meets this requirement need not be the one used in oxyalkylation. Indeed, solvents which are susceptible to oxyalkylation are included in this group of organic solvents. Examples of such solvents are alcohols and alcohol-ethers. However, where a resin is soluble in an organic solvent, there are usually available other organic solvents which are not susceptible to oxyalkylation, useful for the oxyalkylation step. In any event, the organic solvent-soluble resin can be finely powdered, for instance, to 100 to 200 mesh, and a slurry or suspension prepared in xylene or the like, and subjected to oxyalkylation. The fact that the resin is soluble in an organic solvent, or the fact that it is fusible, means that it consists of separate molecules. Phenol-aldehyde resins of the type herein specified possess reactive hydroxyl groups and are oxyalkylation-susceptible.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals or moderately in excess thereof are introduced per phenolic hydroxyl. Such minimum hydrophile property or sub-surface-activity or minimum surface-activity means that the product shows at least emulsifying properties or self-dispersion in cold or even in warm distilled water (15° to 40° C.) in concentrations of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol as described immediately preceding, then, and in that event hydrophile properties are indicated by the fact that one can produce an emulsion by having present 10% to 50% of an inert solvent such as xylene. All that one need to do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene diluted derivatives, which are described elsewhere, for this test rather than evaporate the solvent and employ any more elaborate tests, if the solubility is not sufficient to permit the simple sol test in water previously noted.

If the product is not readily water soluble it may be dissolved in ethyl or methyl alcohol, ethylene glycol diethylether, or diethylene glycol diethylether, with a little acetone added if required, making a rather concentrated solution, for instance 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated resins give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butyl-phenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invention. Another variation is the molecular size of the resin.

Having thus described our invention, what we claim as new and desire to secure by Letters Patent is:

1. Hydrophile synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, xylene-soluble, water-insoluble, acid-catalyzed, low-stage phenol-glyoxal resin; said resin being derived by reaction between a difunctional monohydric phenol and glyoxal; said resin being formed in the substantial absence of phenols of functionality greater than two; said phenol being of the formula:

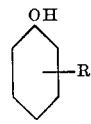

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. Hydrophile synthetic products; said hydrophile synthetic products being oxyalkylation products of (A) Ethylene oxide; and (B) An oxyethylation-susceptible, fusible, xylene-soluble, water-insoluble, acid-catalyzed low-stage phenol-glyoxal resin; said resin being derived by reaction between a difunctional monohydric phenol and glyoxal; said resin being formed in the substantial absence of phenols of functionality greater than two; said phenol being of the formula:

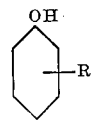

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_{n'}$ wherein $n$ is a numeral varying from 1 to 20; with the proviso that at least 2 moles of ethylene oxide be introduced for each phenolic nucleus; and with the final proviso that the hydrophile properties of said oxyethylated resin in an equal weight of xylene are sufficient to produce an emulsion when said xylene solution is shaken vigorously with one to three volumes of water.

3. The product of claim 2, wherein R is an amyl radical.

4. The product of claim 2, wherein R is an octyl radical.

5. The product of claim 2, wherein R is a nonyl radical.

MELVIN DE GROOTE.
BERNHARD KEISER.

No references cited.